Aug. 13, 1957  J. A. GAYLORD  2,802,252
CANOPY HARNESS RELEASE
Filed Sept. 28, 1953
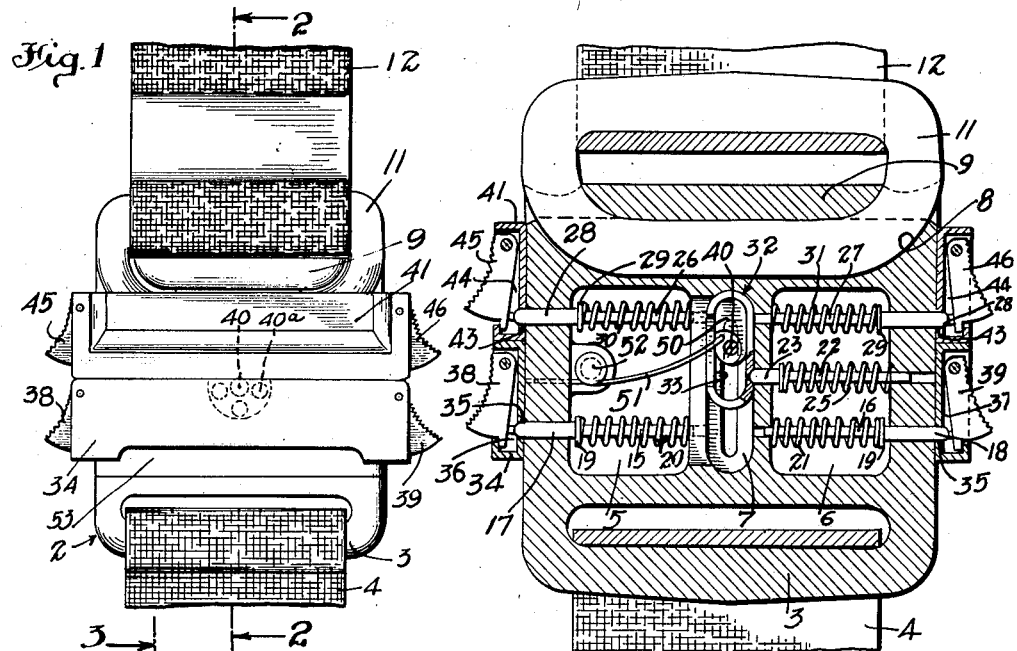
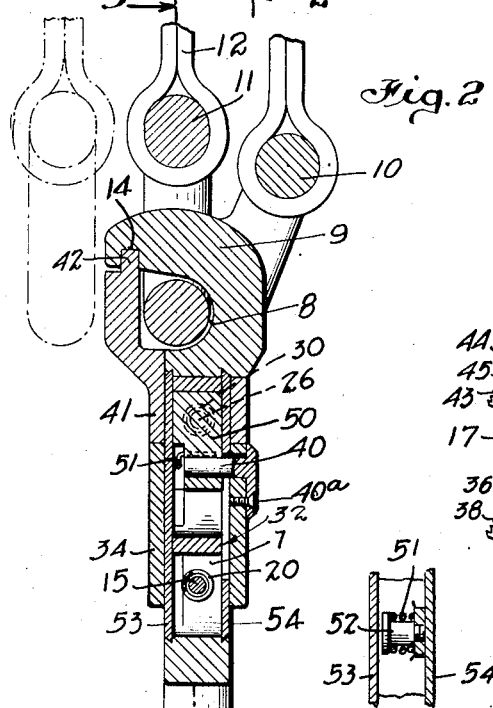
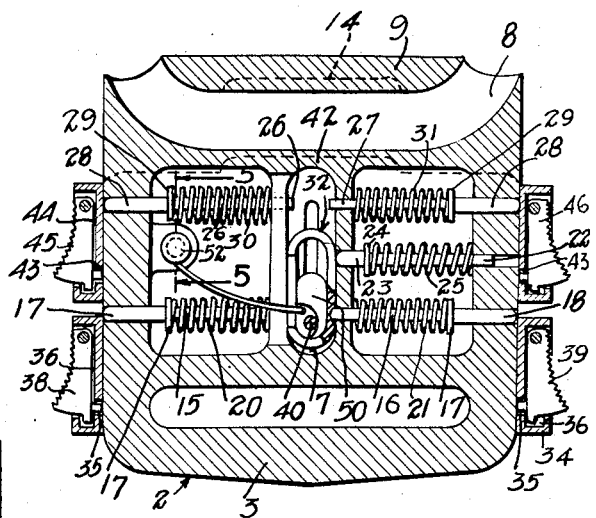
INVENTOR.
JOHN A. GAYLORD
BY Lyon & Lyon
ATTORNEYS United States Patent Office 2,802,252
Patented Aug. 13, 1957

2,802,252
CANOPY HARNESS RELEASE

John A. Gaylord, Pacific Palisades, Calif., assignor of one-half to Rocket Jet Engineering Corp., Glendale, Calif., a corporation of California Application September 28, 1953, Serial No. 382,634

8 Claims. (Cl. 24—241)

This invention relates to a canopy harness release and while not necessarily confined thereto is particularly adapted for releasing a parachute harness from a wearer.

A general object of the present invention is to provide a harness release which can be readily released by an operator using but a single hand the use of which may be somewhat limited, as for example, by the wearing of gloves but which release requires two separately performed operations. More particularly it is an object of this invention to provide a hardness release operated by the successive movement in the same direction of two collars, each provided with locking buttons of similar nature which may be squeezed before movement of the collar.

A further object of the present invention is to provide a harness release which is small in size, sturdy in construction and which affords no danger of an accidental or unintentional release.

The canopy harness release of the present invention, together with further objects and advantages of the invention will be more readily understood from the following description of the preferred form or example of a harness release embodying the invention and for that purpose I hereafter describe the preferred form of a harness release in connection with the accompanying drawings, in which, Figure 1 is an elevation of the canopy harness release in the closed position;

Figure 2 is a section taken in line 2—2 of Figure 1 on a larger scale;

Figure 3 is a section taken on line 3—3 of Figure 2;

Figure 4 is a similar elevation with two operating collars moved to the release position to release the harness, and Figure 5 is a section on the line 5—5 of Figure 4.

Referring to the drawings, the harness release comprises a body 2 which generally is of relatively flat construction corresponding somewhat to the form of the flat harness associated therewith. At the lower end of the body 2 there is an opening or elongated flat ring 3 through which a portion of the webbing of a lower harness member 4 is trained in securing the lower harness member to the release. This lower harness member may in practice lead to the operator. Above the opening 3 the body 2 is provided with the two large rectangular openings 5 and 6 and between the openings 5 and 6 there is a vertically elongated opening 7 in the body. Above the openings 5, 6 and 7 there is a generally arcuate-shaped recess 8, and at this recess the body is indicated as enlarged to form a shoulder 9 and also extended to provide a bail or handle 10.

In operation the arcuate-shaped recess 8 is employed to receive a harness ring 11, which as indicated, may be secured to a harness member 12, which harness member may be a riser to the canopy of the parachute. The enlargement 9 of the body provides the slot 14, which as hereafter pointed out, is intended for forming a locking engagement with the safety collar.

There is provided further two oppositely acting safety pins 15 and 16 axially aligned as indicated in openings in the body movable in the direction of the narrow edges of the body. The safety pins 15 and 16 have an enlarged outer end 17 and 18 against which the washers 17 are placed for engagement by the springs 20 and 21, which urge the safety pins outwardly in the direction of the narrow edge of the body. Above the safety pins 15 and 16 there is provided a friction pin 22 movably mounted in the body parallel to the pins 15 and 16 and the friction pin 22 has its enlarged end 23 on the inner side with a washer 24 serving to contact the spring 25 which yieldingly urges the friction pin inwardly. While as illustrated only a single friction pin is shown, in certain cases another friction pin axially aligned therewith may be added, also moving inwardly.

Above the friction pin 22 there is provided two oppositely acting release pins 26 and 27 likewise movably mounted in openings in the body parallel to the other friction pins, the release pins 26 and 27 having their enlarged ends 28 at the outer side of the body, the washers 29 and the springs 30 and 31 contacting such washers for urging the release lock pins outwardly. Each of the springs 20, 21, 30 and 31 are located in one of the openings 5 and 6 of the body. Within the opening 7 there is provided a locking dog 32 which is vertically movable in said opening from the position where it is in the upper end of the opening 7 and in contact with the release lock pins 26 and 27 to a position in the lower end of the slot 7 where it is out of the way of an inward movement of the release lock pins 26 and 27. The locking dog 32 is in frictional contact with the inner end of the friction pin 22 which therefore offers a frictional resistance to the movement of the locking dog. The locking dog is further provided with the elongated opening 33. Within the opening 33 is the traveling member 50 which is of shorter length than the opening 33 and this member 50 is normally urged downwardly, as viewed in Figures 3 or 4, by a spring 51, one end of which is attached to the member 50 and the other end of which is coiled and attached to the projection 52 located in the opening 5.

There is further provided a safety collar 34 which encloses the body 2 and is in vertical sliding contact therewith. The safety collar 34 is provided at its end wall with the openings 35 which, in the locked position of the release, allows the entrance of the large end of the safety lock pins 15 and 16, which thus provide a means for locking the safety collar against movement relative to the body 2. The safety collar at its edges is provided with the undercut recesses 36 and 37 in which are pivotally mounted the release buttons 38 and 39, the moving ends of which in the locking position are in contact with the safety pins 15 and 16 and restrained from further outward movement by the wall of the undercut recesses. The safety collar 34 is further provided with a pin 40 attached thereto by the setscrew 40a, which enters a recess in the member 50 so that the member 50 is vertically movable with the movements of the collar 34.

There is further provided a release collar 41 likewise slidable on the body and adapted in the closed position to cover the top side of the arcuate recess 8 and in such position is therefore operated to prevent removal of the harness ring from said recess. The lower side of the release collar 41 is in contact with the safety collar 34 and when said safety collar is locked in position the tongue 42 of the release collar 41 is inserted into the recess 14 of the body as a further protection against the harness ring being removed therefrom. The safety collar 41 is provided at its ends with the openings 43 through which the enlarged end of the release pins 26 and 27 enter so as to serve to lock the release collar in position until such pins are forced inwardly. At the end of the release collar there are provided undercut recesses 44 which mount the pivoted lock buttons 45 and 46 the moving ends of which are in contact with the release lock pins 26 and 27 and the undercut portion of the recesses 44.

There is further provided two sliding covers 53 and 54 which enclose the openings 5, 6 and 7 and elements mounted therein, the cover 54 having a slot for entrance of the pin 40.

In the operation of the harness release of the present invention it will be seen that with the device in the locked position, as shown for example in Figure 1, to release the same the operator must first press inwardly simultaneously the two lock buttons 38 and 39 thereby pushing the safety locking pins 15 and 16 out of the openings in the safety collar before that safety collar 34 may be slid downwardly. This operation is readily performed even by a person handicapped by a gloved hand as it requires merely a natural inward squeezing movement and is hardly one which permits of any accidental accomplishment. As the safety collar 34 is moved downwardly the locking dog 32 is pulled downwardly by the setscrew 40 against the friction of the friction pin 22. Before this movement the inner ends of the release lock pins 26 and 27 were in contact with the locking dog which would prevent their inward movement. After the movement of the locking dog downwardly the release lock pins 26 and 27 are free to move inwardly. The release collar then may be moved downwardly by first squeezing simultaneously the lock buttons 45 and 46 so as to move the lock pins 26 and 27 from out of the opening in the safety collar 41. On movement of the safety collar 41 downwardly the highest ring attached to the parachute riser will snap rapidly from the release.

From the foregoing description it will be seen that I have provided a harness release well protected against accidental operation and yet one readily operated by two successive operations in the same direction which can be effected by one hand of an operator. Furthermore, the harness release of the present invention is readily constructed in a durable manner without being excessively heavy or larger in dimensions than the remainder of the harness for which it is to act as a locking release.

While the particular form of the harness release herein described is well adapted to carry out the objects of the present invention, this invention is of the scope set forth in the appended claims.

I claim:

1. A canopy harness release comprising, a body having a recess at one end for receiving a harness member, a release collar slidable relative to the body to and from a closed position where it covers said recess, a spring-tensioned release member normally holding the release collar in the closed position, a locking dog for preventing actuation of said release member, and a safety collar movable relative to said body for moving said locking dog.

2. A canopy harness release comprising, a body having a recess at one end for receiving a harness member, a release collar slidable relative to the body to and from a closed position where it covers said recess, a spring-tensioned release member normally holding the release collar in the closed position, a locking dog for preventing actuation of said release member, a safety collar movable relative to said body for moving said locking dog, the safety collar and release collar both movable in the same direction on said body.

3. A canopy harness release comprising, a body having a recess at one end for receiving a harness member, a release collar slidable relative to the body to and from a closed position where it covers said recess, a spring-tensioned release member normally holding the release collar in the closed position, a locking dog for preventing actuation of said release member, a safety collar movable relative to said body for moving said locking dog, and spring-actuated safety pins normally retaining the safety collar in position to prevent actuation of the release collar.

4. A canopy harness release comprising, a body having a recess at one end for receiving a harness member, a release collar slidable relative to the body to and from a closed position where it covers said recess, a spring-tensioned release member normally holding the release collar in the closed position, a locking dog for preventing actuation of said release member, a safety collar movable relative to said body for moving said locking dog, and spring-actuated safety pins normally retaining the safety collar in position to prevent actuation of the release collar, the safety collar and release collar both movable in the same direction on said body.

5. A canopy harness release comprising, a body having a recess at one end for receiving a member of a harness, a release collar slidable on the body to and from a closed position where it covers said recess, a pair of oppositely moving spring-actuated release pins for normally retaining the release collar in the closed position, a safety collar likewise movable on said body and normally operating until moved to prevent actuation of said release pins, such safety collar being normally retained from movement by a pair of oppositely acting spring-actuated safety pins.

6. A canopy harness release comprising, a body having a recess at one end for receiving a member of a harness, a release collar slidable on the body to and from a closed position where it covers said recess, a pair of oppositely moving spring-actuated release pins for normally retaining the release collar in the closed position, a safety collar likewise movable on said body and normally operating until moved to prevent actuation of said release pins, the safety collar being connected to a dog which is movable to and from the path of movement of the spring-actuated release pins.

7. A canopy harness release comprising, a relatively flat body member having a recess at one end for receiving a member of a harness, relatively flat elongated release collar movable to an enclosed position to cover said recess, a pair of spring-actuated release pins movable in the direction of the narrow edge of said release collar for retaining the same in the closed position, a safety collar likewise movably mounted on the body and a member actuated by said safety collar to and from a position to prevent actuation of the spring-actuated release pins, and a pair of spring-actuated pins normally retained to prevent a movement of said safety collar, said pins being movable toward the narrow side of said safety collar.

8. A canopy harness release comprising, a relatively flat body member having a recess at one end for receiving a member of a harness, relatively flat elongated release collar movable to an enclosed position to cover said recess, a pair of spring-actuated release pins movable in the direction of the narrow edge of said release collar for retaining the same in the closed position, a safety collar likewise movably mounted on the body and a member actuated by said safety collar to and from a position to prevent actuation of the spring-actuated release pins, and a pair of spring-actuated pins normally retained to prevent a movement of said safety collar, said pins being movable toward the narrow side of said safety collar, said safety collar and release collar both being movable in the same direction to the open position.

References Cited in the file of this patent

UNITED STATES PATENTS

| 828,823 | Maize | Aug. 14, 1906 |
| 2,010,277 | Smith | Aug. 6, 1935 |
| 2,347,263 | Higgens | Apr. 25, 1944 |
| 2,393,072 | Skinner | Jan. 15, 1946 |
| 2,674,773 | Lundholm | Apr. 13, 1954 |